United States Patent [19]
Richman

[11] 3,778,608
[45] Dec. 11, 1973

[54] ELECTRICAL MEASURING SYSTEMS USING A QUARTER-SQUARE MULTIPLIER

[76] Inventor: Peter L. Richman, 22 Barberry Rd., Lexington, Mass. 02173

[22] Filed: Aug. 30, 1971

[21] Appl. No.: 176,027

Related U.S. Application Data

[62] Division of Ser. No. 39,791, May 22, 1970, Pat. No. 3,633,116.

[52] U.S. Cl............... 235/194, 324/142, 328/144,
[51] Int. Cl............................ G06g 7/16, G01r 11/32
[58] Field of Search................ 235/194, 195, 193.5, 235/196, 151.3, 151.31; 328/144, 145, 142; 324/142 307/229, 230

[56] References Cited
UNITED STATES PATENTS

| | | |
|---|---|---|
| 3,393,308 | 7/1968 | Cope.............................. 235/194 X |
| 2,879,477 | 3/1959 | Miller et al........................ 324/142 |
| 3,413,456 | 11/1968 | Sutton................................ 235/194 |
| 3,445,768 | 5/1969 | Ferguson ...................... 235/194 X |
| 3,517,311 | 6/1970 | Wasielewski.................... 235/194 X |

*Primary Examiner*—Joseph F. Ruggiero
*Attorney*—Schiller and Pandiscio

[57] ABSTRACT

A system for measuring electrical power and including a pair of converters for providing a pair of output pulse trains, the duration of the pulse being proportional to the means squared value of input signals to the converters. A circuit is included for generating a signal proportional to the difference between corresponding pulses; where the input signals to the converters are $E + I \cos \theta$ and $E - I \cos \theta$, the difference signal is essentially $E I \cos \theta$, the power sought.

10 Claims, 12 Drawing Figures

ELECTRICAL MEASURING SYSTEMS USING A QUARTER-SQUARE MULTIPLIER

This is a division of application Ser. No. 39,791, filed May 22, 1970, now U. S. Pat. No. 3,633,116, issued Jan. 4, 1972.

This application relates to measurement of electrical signals and more particularly to the conversion of the mean squared value of an input signal into a time function which can be readily digitized, and use of such conversion to provide a multiplier.

Perhaps the most apparent use of a system which converts a mean squared value of a signal into digital form is to measure electrical power in an A-C circuit in accordance with the quarter square principle. The latter recognizes that if an input voltage is E and the input current is I cos $\theta$ (both E and I being variable in time), the power P can be represented as:

$$P = (E + I \cos \theta)^2 - (E - I \cos \theta)^2 \quad (1)$$

because equation (1) simplifies to $$P/K = EI \cos \theta \quad (2)$$

where K = 4.

In the prior art, most power measurements have been made by applying the unknown current and voltage to the coils of a moving-coil wattmeter, or to the inputs of dynamometers of various types. Such systems are very limited in response speed, frequency range and accuracy; they tend to be clumsy to use and are suitable primarily under laboratory conditions if one seeks to obtain any reasonable degree of accuracy.

A principal object of the present invention is therefore to provide means for measuring the power in a system with high accuracy and in very short times, typically to several MHz and in the order of a few hundredths of a percent accuracy to 50 KHz, and within a few seconds. Another object of the present invention is to provide such a power measuring means which provides the computed power in digital readout form. Yet another object of the present invention is to provide such a power measuring means which requires substantially no adjustments by an oeprator save perhaps setting up range switches.

The basic system employed is an implementation of the quarter-square method above described. Therefore, yet another principal object of the present inveniton is to provide means for squaring a signal amplitude, on a wideband basis. Yet another object of the present invention is to provide such a squaring means which provides the computed value of the square in digital form. In a more general sense in some aspects, yet somewhat more limited sense in others, an object of the present invention is to provide means for generating a power function of the type $A^2$ where A is the amplitude of an input signal.

If one notes that the ultimate result sought as expressed in equation (2) is a product, it will be apparent that, generally, a principal object of the present invention is to provide a multiplier.

These foregoing and other objects of the invention are effected by using a closed loop system for converting the amplitude of an input signal into an output signal having a temporal parameter proportional to the square of that amplitude.

To achieve the foregoing and other objects, the present invention generally contemplates the provision of a power-to-time conversion device which accepts an input signal and generates an output signal having a temporal parameter proportional to the square of the amplitude of the input signal. Basically, this device comprises a comparator for comparing the power in the input signal with the power in a feedback signal, and means for generating an iterative signal having a time parameter, such as period or frequency proportional to the difference or error signal yielded by the comparator. The iterative signal is employed to generate the feedback signal such that the only variable in the latter is the time parameter. The multiplier thus comprises two such power conversion devices, the inputs of which are intended respectively to have applied thereto signals corresponding to the sum of and the difference between multiplier and multiplicand values. The outputs of the conversion devices are then respectively coupled to means for subtracting the time parameter of the output signal of one device from the time parameter of the output signal of the other device. The difference in temporal parameters thus obtained is converted in appropriate means into an output signal for recording or display.

The foregoing and other objects of the present invention will in part be obvious and will in part appear hereinafter. The invention accordingly comprises the appratus possessing the construction, combination of elements, and arrangement of parts, all of which are exemplified in the following detailed disclosure, and the scope of the applications of which will be indicated in the claims.

For a fuller understanding of the nature and objects of the present invention, reference should be made to the following detailed description taken in connection with the accompanying drawings wherein FIG. 1 is a block diagram of a generator of an output signal having a temporal parameter proportional to the square of an input signal;

Figure 1:
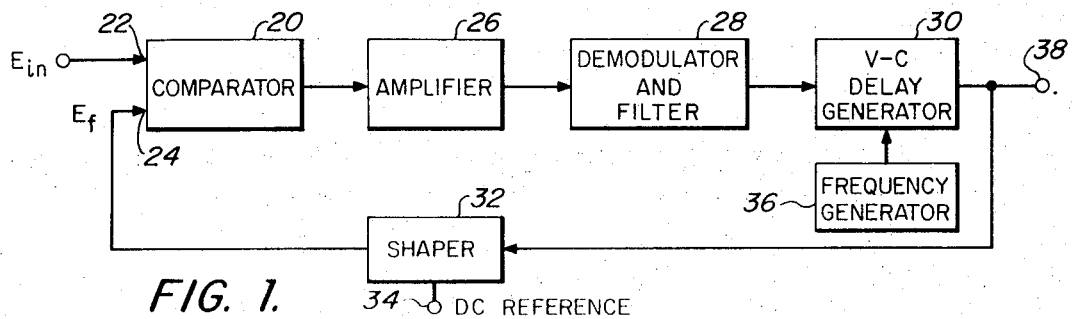

Referring now to the drawings, particularly in FIG. 1, there is shown a basic embodiment of one converter of the present invention. The circuit includes power comparator 20 shown as a generalized device which includes a pair of input comparison terminals 22 and 24 and which supplied an output signal either A-C or D-C, proportional to the difference between the values of the electrical power of the signals applied at input terminals 22 and 24. Input terminal 22 is intended to have applied thereto an input signal $E_{in}$ and terminal 24 is connected so that a feed-back signal $E_f$ can be applied thereto.

Thus, the power comparator need not measure electrical power accurately, it need only furnish zero change in output for zero difference in the powers, of the two applied signals, $E_{in}$ and $E_f$, and some finite, not-necessarily-linearly-realted output for a difference between the power in $E_{in}$ and $E_f$ that is nonzero.

The output of the comparator is connected to amplifier 26 and thence to demodulator-filter 28 in the case where the comparator's output is A-C. When the comparator's output is a D-C representing the error or difference between the electrical powers of the two input signals, demodulator-filter 28 is, of course, unnecessary.

The output of demodulator-filter 28 (or directly from the amplifier when the output from the power comparator is a D-C signal) is connected to voltage controlled delay generator 30. In its simplest form, the latter is a multivibrator whose delay is determined, roughly, by the magnitude of the D-C potential applied. The design of such a multivibrator is well known to those skilled in the art. Delay generator 30 is preferably clocked; i.e., it generates repetitive pulses, the pulse widths of which are D-C controlled, at a repetition rate determined by precision frequency generator 36. The frequency typically can be 20 Hz, for example, and the pulse width might vary from 0 to some reasonable fraction of a whole cycle, such as one-half (25 milliseconds) or three-quarters (37.5 milliseconds) corresponding with zero and full-scale input power respectively.

Output of voltage-controlled delay generator 30 is applied to shaper 32, which is also furnished with a D-C reference on terminal 34. The shaper provides at its output a signal of precision peak amplitude established by the D-C reference and over a time interval determined by the pulse width of the concurrent pulse from the delay generator. The preiod of each pulse cycle from the shaper is, of course, the same as the period of the pulse from the delay generator, and, in turn, equal to the period of the output from frequency generator 36. It will be understood that the value of the D-C reference is fixed; that is, remains relatively invariant during at least one cycle of the comparator or is short-term invariant. However, the D-C reference value should be adjustable over long term, thereby providing flexibility in operating and indeed may even be automatically adjustable in terms of the amplitude of the input similar to a conventional automatic range changing system.

The shaper output is furnished as the second input at terminal 24 to power comparator 20 to close the feedback loop. The output of generator 30 applied to terminal 38 is a pulse whose duration is accurately proportional to the square of the rms value of the input $E_{in}$ or $(E_{in\ (rms)})^2$. It is quite independent of the accuracy of generator 30 and depends only on the accuracy of the D-C reference voltage applied at terminal 34, the ability of the power comparator to function as an effective null-device for equal power inputs, and the gain of amplifier 26.

Figure 2:
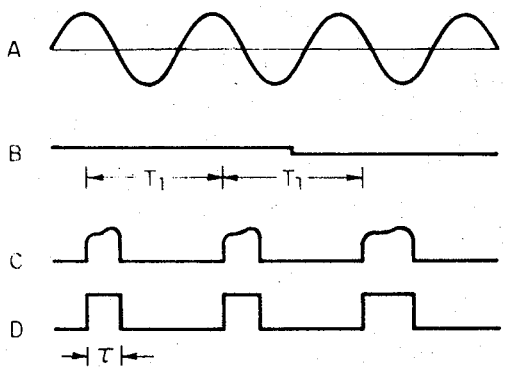
FIG. 2 is a group of exemplary waveforms illustrative of the operation of the generator of FIG. 1.

That the duration of the width of each of the periodic output pulses applied to terminal 39 is proportional to $(E_{in\ (rms)})^2$ may be seen from the following considerations. With reference to FIG. 2, the input applied to terminal 22 in FIG. 1 is shown as waveform A for exemplary purposes. It need not be regular, undistorted, or even periodic for that matter for the device of FIG. 1 to work properly. FIG. 2B shows the output from the power comparator in the case in which the electrical power in each of the two signals $E_{in}$ and $E_f$ have not yet nulled, so that there is a small residual error at the comparator output, which is assumed to be variable D-C for exemplary purposes. FIG. 2C shows an exemplary output from delay generator 30, a wave of fixed period $T_1$ and variable duty-cycle, the positive portion of which has variable duration FIG. 2D shows the waveform of FIG. 2C after shaping; i.e., with a flat-topped, fixed amplitude value. It should be noted that typically the period of the comparator output (FIG. 2B) will be at least 10 to 20 times longer than the longest periods of the input and feedback waves (FIGS. 2A and 2D) in order that the thermal power comparator can at least partially stabilize during each half cycle of FIG. 2B.

The electrical power supplied to an arbitrary selected one-ohm resistor by the signal of FIG. 2D, assuming its amplitude is e, is:

$$P = \frac{1}{T} \int_0^\tau e^2 dt \qquad (3)$$

The upper limit may be set at $\tau$ in view of the fact that the wave fo FIG. 2D is zero for all times except from 0 to $\tau$.

Equation (3) may be reduced by straightforward integration, to $P = 1/T, e^2\tau$ Thus, the power in the feedback signal is proportional to the fixed constants $e$ (the reference voltage applied to terminal 34) and $T_1$, the fixed period of the periodic output from generator 30 as set by the frequency standard of generator 36. It is also proportional, directly and linearly, to the duration $\tau$ of the positive portion of the wave from shaper 32. Thus, a measurement of the duration $\tau$, by conventional means — such as by counting the number of pulses of a precision pulse generator that fall within the duration — will yield a highly accurate number for the electrical power applied in the signal $E_{in}$, which is itself proportional to $(E_{in\ (rms)})^2$. Thus, the entire converter of FIG. 1 is referred to as a V/S or volts-to-square converter, since a temporal parameter of its output (time interval per cycle) is linearly proportional to the square of the rms value of its input.

Figure 3:
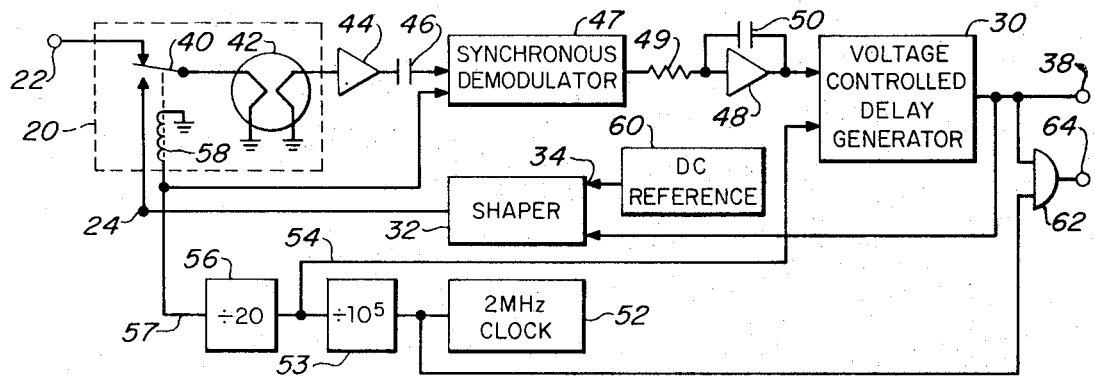
FIG. 3 is a more detailed diagram, partly in block form, showning one embodiment of the generator of FIG. 1.

With reference now to FIG. 3, there is shown a more specific version of the device of FIG. 1 wherein like numerals denote like parts. The power comparator 20 comprises an electro-mechanically, periodically-operated switch 40 driving an indirectly heated thermocouple 42. When the armature of switch 40 contacts the upper contact as shown, it connects thermocouple 42 to the input signal $E_{in}$ applied to terminal 22. When the switch armature contacts the lower contact, it connects the thermocouple input to terminal 24 and so to the source of feedback signal $E_f$, shaper 32. Thus, the thermocouple is alternately heated with the input and the feedback signal so that its output potential moves between two levels, one dependent upon the power generated by the input $E_{in}$ applied to the fixed thermocouple input resistance, or in effect dependent upon the square of the rms value of $E_{in}$; and the other dependent upon the square of the rms value of $E_f$ as required by the basic scheme of FIG. 1.

Amplifier 26 and demodulator-and-filter 28 of FIG. 1 are shown in more detail in FIG. 3, as A-C amplifier 44, coupling capacitor 46, synchronous demodulator 47 and an integrator (filter) composed of operational amplifier 48, with input resistor 49 and feedback capacitor 50. Voltage controlled delay generator is designated 30.

A high-frequency clock 52, a source of timing pulses at a repetition rate of, for example, 2 MHz is required to operate and control the various counting and timing operations in a practical power measurement. Its output is divided by $10^5$ in five-decade counter 53.

The selection of the clock frequency at 2 MHz is arbitrary. It could be much higher, thereby, however, implying more complexity in the associated counting equipment. Alternatively, it could be much lower, thereby implying less resolution in the final measurement. The figure of 2 MHz provides a resolution of better than one part in 10,000 (or 0.01 percent) even at 1/10 of full output; and provides 0.001 percent resolution at or near full output, as will be seen.

The output from the five-decade counter is applied over line 54 to delay generator 30 to initiate the pulses from the latter and control the repetition rate or period of the pulse train from generator 30. The pulse train on line 54 is at a 20 Hz rate for the example of a 2 MHz clock and a $10^5$ divider.

There is provided a second divider 56, selected to divide further the output freqeuncy from divider 53 by a factor chosen for examplary purposes as 20. The output of this divide-by-20 counter 56 is, thereofre, one Hz and is suitable for actuating the armature of switch 40 to alternately sample the two signals, $E_{in}$ and $E_f$ as earlier described. Thus, line 57 from the output of divider 56 is connected to actuate relay coil 58, the contacts shown in switch 40 being contacts of the relay. Another system for accomplishing switching would be to use electronic components such as field-effect transistors to connect and disconnect $E_{in}$ and $E_f$ alternately to the input of the heater of the indirectly-heated thermocouple 42, or to an amplifier driving the heater.

Output from the divider 56 is also connected to provide the reference or demodulating signal for the synchronous demodulator 47 as shown.

The D-C reference source input 34 of shaper 32 is shown supplied from an explicit fixed D-C reference source 60. This latter will typically take the form of a precision reference zener diode with appropriate preregulation. For highest accuracy and stability, reference source 60 will ordinarily be housed within a precision component oven and maintained thereby at constant temperature. However, as previously noted, the term "fixed" here does not exclude adjustability over the long term and is to be considered as meaning invariant only over short term.

The output from the same 2 MHz clock 52 that initiates all of the other timing operations is gated via AND gate 62 by the output of the generator 30, to provide at terminal 64 a train of pulses which is proportional in number to $(E_{in\ (rms)})^2$ as may be required if the square alone is what is desired. The gate signal from the output of generator 30 is also applied to output terminal 38.

Figure 4:
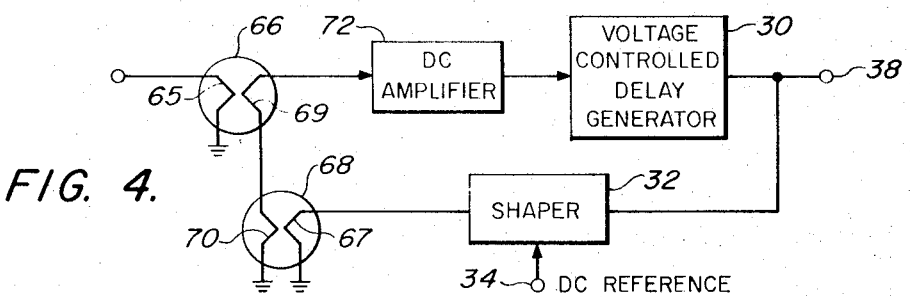
FIG. 4 is a diagram, partly in block, of yet another embodiment of the generator of FIG. 1.

Referring now to FIG. 4, there will be seen another implementation of an $E^2$/Time-Interval converter, in which the comparison between $(E_{in})^2$ and $(E_f)^2$ is carried out continuously, instead of on a switched or intermittent basis as in the device of FIG. 3, although like numerals denote like parts. The embodiment of FIG. 4 thus has the advantage of somewhat higher speed that the loop of FIG. 3, but suffers somewhat in accuracy. In cases in which lower accuracy is needed but speed is paramount, the implementation of FIG. 4 should be employed.

In FIG. 4, the input $E_{in}$ is applied directly and non-intermittently to heater 65 of an indirectly-heated thermocouple 66, while the feedback voltage $E_f$ is also nonintermittently applied to heater 67 of second indirectly-heated thermocouple 68. The two thermocouple outputs, appearing on thermocouple elements 69 and 70, respectively, are summed series opposing as shown, so that if the power inputs to the two thermocouples are equal, the output at the high end of thermocouple element 69 applied to D-C amplifier 72 will be zero.

Since the error from the output of the series-opposing sum of thermocouple element outputs applied to the D-C amplifier is a D-C potential, the output from the D-C amplifier may be directly applied to generator 30 as shown. The output of the latter is again shaped by shaper 32, driven also by D-C reference applied to terminal 34, the shaper output being of the same pulse width as the output from generator 30, but with an amplitude precisely equal to the D-C reference. Shaper output is $E_f$, and is applied to the heater 67 of thermocouple 68 as described.

The other aspects similar to FIG. 3 are omitted from FIG. 4 for simplicity. FIG. 4 merely serves to show a difference in implementation for the $E^2$/Time Interval converter of FIG. 3, and makes no attempt to duplicate the other features remainder of FIG. 3.

Figure 5:
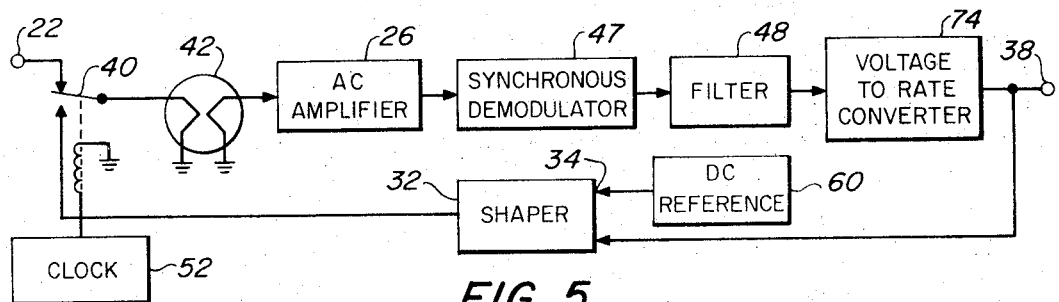
FIG. 5 is a diagram, partly in block form of a generator of an output signal having a frequency proportional to the square of an input signal.

The device shown in FIG. 5 is another squarer or generator of an iterative output signal having a temporal parameter proportional to the square of the amplitude of an input signal; the temporal parameter in this instance is the frequency of the output signal. This device is useful in forming a multiplier as will be described hereinafter, but being known in the art will only be described briefly here. It can be structured in a manner quite similar to FIGS. 1 and 3 like numerals denoting like parts, but includes voltage-to-rate converter 74 in place of the converter 30 of FIG. 1. Obviously, converter 74 can be a well-known voltage controlled oscillator which provides a pulse train with fixed duration pulses at a frequency approximately proportional to the input D-C.

The volts/rate converter requires no trigger from a 20 Hz clock; so none is provided; however, since a low-frequency signal is still needed to actuate the input switch 40 and simultaneously to gate the synchronous demodulator 47, it is provided for simplicity in FIG. 5 by an asynchronous or free-running, one Hz clock 52.

Output from the volts/rate converter applied to terminal 38 constitutes the output from the entire system.

The device of the type shown in FIGS. 1 and 3 and 4 are preferred over that of FIG. 5 for use in forming a multiplier for a variety of reasons, not the least of which are that one can control with much greater accuracy and over a much larger range, pulse width or duration than pulse train repetition rate or frequency. Further, considerably less bandwidth requirements are imposed upon the elements of a system when the frequency is fixed as in the devices generating variable pulse width trains.

Figure 6:
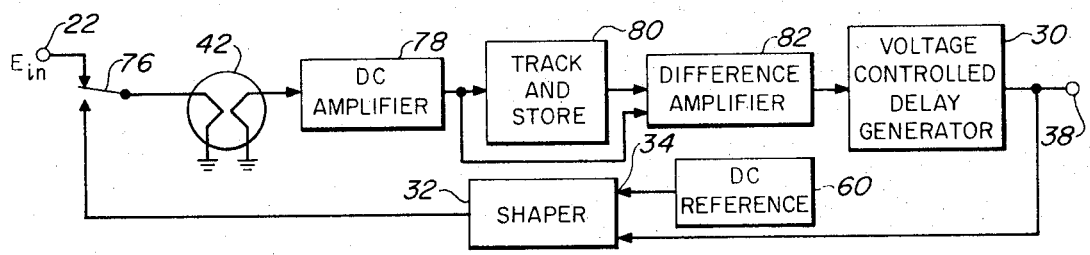
FIG. 6 is a diagram, partly in block form, of yet another device for providing pulsed output signal having a pulse duration proportional to the square of an input signal.

FIG. 6 shows still another different implementation of the basic generator of an output signal having a temporal parameter proportional to the square of an input signal very closely allied to the device of FIG. 1. FIG. 6 shows a different way of using the equal-power, time-interval scheme to obtain a time-interval that is proportional to the square of the input voltage, and comprises input terminal 22 connectable through switch 76 to the heater of thermocouple 42. The output of thermocouple 42 is connected to the input of D-C amplifier 78 and the latter, in turn, is connected at its output to the input of switchable track-and-store circuit 80. The output of amplifier 78 and the output of circuit 80 are respectively connected to corresponding input terminals of difference amplifier 82. The output of the latter is connected to control voltage-controlled delay generator 30 of the type hereinbefore described. The output of the latter is connected to both output terminal 38 and an input of shaper 32. The latter is, as previously noted, connected also to D-C reference source 60 which provides a precision amplitude value for the pulses from the output of the shaper. The latter output is connectable alternatively through switch 76 to the thermocouple heater.

The input switch 76 is now not synchronously and periodically alternated from one contact to another, to obtain a continuous, carrier-operated comparison of input power with feedback power. Instead, the input switch rests in the upper position connected to terminal 22 for a period of five to 10 seconds, until the input thermocouple settles to a fixed value proportional to the square of the input voltage $E_{in}$. The thermocouple output is amplified by D-C amplifier 78 and is stored either in an analog sense or else digitally in track-and-store device 80. Then the switch 76 is switched to the lower or feed-back contact, connecting to the shaper output. The D-C amplifier again amplifies the thermocouple output, but synchronously with switch 76, the track-and-store device 80 has been switched into the store mode, so that the difference amplifier 82 receives simultaneously a D-C signal from the track-and-store device 80 representing the output of the thermocouple 42 with $E_{in}$ applied, as well as the present D-C signal from the D-C amplifier with the feedback voltage applied to the input thermocouple.

The difference amplifier amplifies any difference between these two potentials, and provides an error or difference signal which controls the pulse width generated by generated 30. The output of the latter drives shaper 34 to generate the required ffeedback pulses. When the loop has nulled this time, the output at terminal 38 will be the stored pulse width as required, proportional to the $(E_{in\ (rms)})^2$ as required. In this system, an entire new determination of the value is obtained only every five or 10 seconds, as opposed to the previous systems in which it is continuously available.

Figure 7:
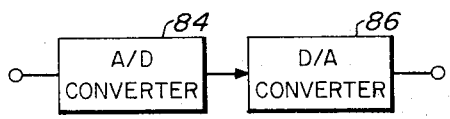
FIG. 7 is a block diagram of a typical track-and-store circuit useful in the embodiment of FIG. 6.
Figure 8:
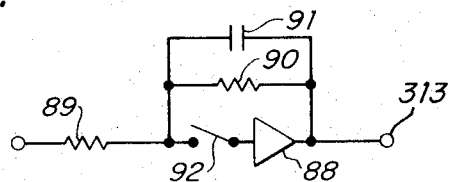
FIG. 8 is another version of a track-and-store circuit useful in the device of FIG. 6.

FIG. 7 shows a typical digital form of a track-and-store device that can be employed for circuit 80 in FIG. 6. It is merely an A/D (analog-to-digital) converter 84 followed by a D/A (digital-to-analog) converter 86. When the register or counter within A/D 84 is disconnected from its inputs, it is effectively put into the store mode and will store the digits indefinitely. With the register or counter in A/D converter connected, D/A converter 86 will provide a D-C output proportional to the digits as required to track the input to converter 84. FIG. 8 shows an analog track-and-store device formed of an integrator comprising a high gain inverting amplifier 88 with an input resistor 89, feedback resistor 90 and feedback capacitor 91. A switch 92 between the input of amplifier 88 and the junction of resistors 89 and 90 is opened to initiate storage thereby disconnecting any further current flow into the input of the amplifier and providing a constant, stored analog potential at the output terminal 313. When switch 92 is closed, the output of the system tracks the input.

Figure 9:
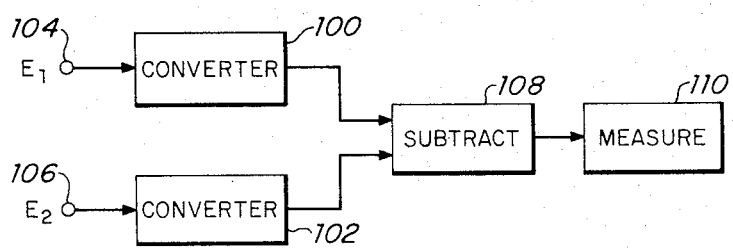
FIg. 9 is a block diagram illustrating the multiplier of the present invention.

To form a multiplier according to the present invention two V/T converters 100 and 102 are employed as shown in FIG. 9, respectively, having input terminals 104 and 106 at which input signals such as $E_1$ and $E_2$ can be applied. The outputs of converters 100 and 102 are connected to the input of subtraction circuit 108. The output of the latter in turn is connected to an output circuit 110 for measuring, display, or the like.

Figure 10:
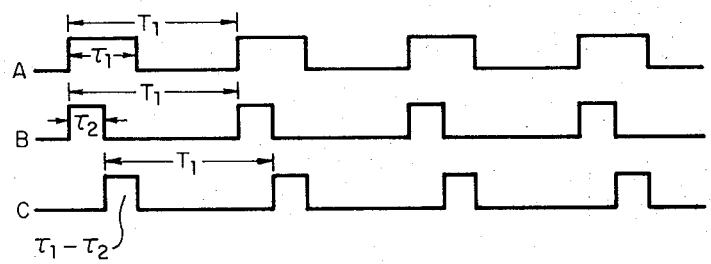
FIG. 10 is a group of waveforms illustrating the operation of a typical embodiment of the device of FIG. 9.

The operation of the block diagram of FIG. 9 is advantageously described in connection with the waveforms of FIG. 10. For simplicity, one can assume that converters 100 and 102 are of the type shown in FIG. 3 and both operate from a common D-C reference and a common clock so that they are synchronous. Thus, exemplary output signals from converters 100 and 102 graphed on a common time base are shown graphically in FIGS. 10A and 10B, respectively. The leading edges of the pulses are simultaneous and their periods $T_1$ are identical because of the common clock, their amplitudes are identical because of the common D-C reference, and they differ only in pulse width $\tau_1$ and $\tau_2$. By subtracting in circuit 108 the pulse widths of corresponding pulses in one train from the other, one obtains a seris of difference $(\tau_1 - \tau_2)$ pulses shown in FIG. 10C. Typically, circuit 108 can be a multivibrator triggered respectively "on" and "off" by successive negative-gain pulse transitions or the like. Circuit 110 to which the difference pulses are applied may be a conventioanl counter in its so-called "period" mode of operation. The output of the counter will be a digital display of the difference $\tau_1 - \tau_2$, which will be accurately proportional to the difference between the mean squares of $E_1$ and $E_2$, as described.

If the inputs $E_1$ and $E_2$ are $(A+B)$ and $(A-B)$, respectively, then the counter will read the product $AB/K$ where $K = 4$ as previously described. The invention in effect then is a multiplier: a primary purpose of the multiplier is to accurately determine power.

If $E_1$ and $E_2$ are $(E + I \cos \theta)$ and $(E - I \cos \theta)$, then the digital number displayed on the counter will be proportional to the power presented by the product $EI \cos \theta$. Appropriate scaling may be introduced by selecting the frequency of the high-frequency pulses counted during the difference period in the counter, by selecting the number of periods over which the measurement will be averaged in the counter, and by selecting the maximum duration of $\tau_1$ and $\tau_2$.

Figure 11:
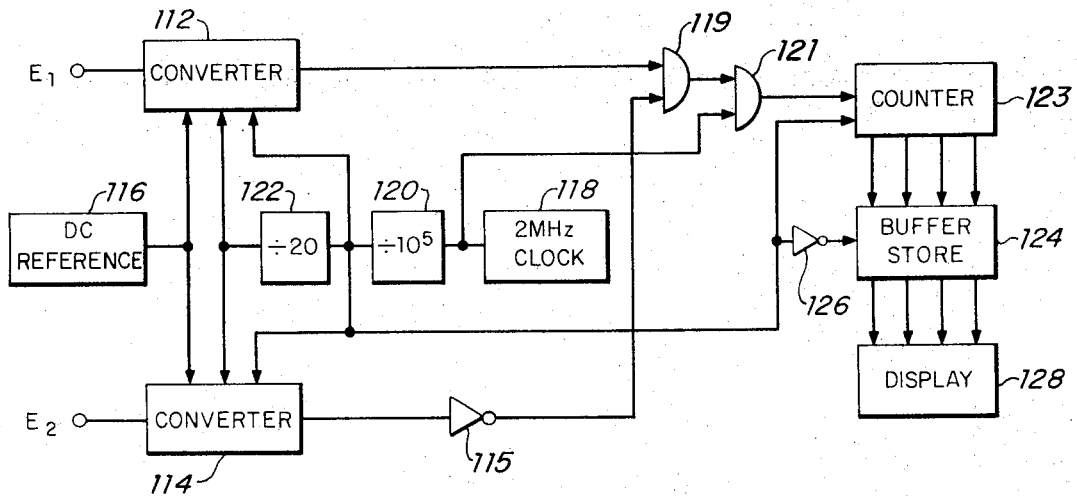
FIG. 11 is a block diagram of a more specific implementation of the device of FIG. 9.

Referring now to FIG. 11, there is shown a detailed version of the power-measuring implementation of FIG. 9, using the specific $E^2$/Time Interval converter of either FIG. 3 or of FIG. 4. As in FIG. 9, two $E^2$/Time Interval converters 112 ad 114 are employed, for respective inputs $E_1$ and $E_2$. Common D-C reference source 116 supplies D-C to the shapers within each of the $D^2$/Time Interval converters. A common clock, 118, chosen to provide signals at a typical freuqncy of 2 MHz, drives a cpmmon $10^5$ divider 120 the output of which feeds a common divide-by-20 counter 122. The outputs of dividers 120 and 122 are connected to both of the $E^2$/Time Interval converters in a manner previously described in connection with FIG. 3.

The outpus of converters 112 and 114 are as shown in FIGS. 10A and 10B, respectively, and as already described in connection with FIG. 9. Time-interval subtraction is shown explicitly in FIG. 11 (instead of just in block form of subtraction circuit 108 in FIG. 9), as the inversion by inverter 115 of the output signal of converter 114 and the application of this inverted signal to either with the noninverted output signal from converter 112, to AND gate 119. Output of AND gate 119 is as shown in FIG. 10C: a signal whose duration is equal to the difference in durations between an output pulse from converter 112 and that from converter 114. This signal from gate 119 subsequently gates the 2 MHz clock pulses in another gate 121 at the start of the time-interval measurement. Output from gate 121 is counted by counter 123, with appropriate start pulses derived from the output of the $10^5$ divider 120. Buffer store 124, activated by the trailing edge of the pulses from divider 120 via inverter 126, transfers the count into a register to furnish nonflickering display in diaplay unit 128 (for example, an array of Nixie tubes) in conventional manner well known to those skilled in the art.

It will be appreciated that the circuit of FIG. 9 can also be implemented using the converter shown in FIG. 5. In such instances, the subtraction circuit 108 would need to provide a signal representing the difference between the frequencies or repetition rate of the two input signals thereto, and could comprise an appropriate version of the well-known beat-frequency oscillator or an up-down converter for example. The measuring circuit 110 would then merely need be a frquency meter to indicate the value of the difference signal, or a digital display for the output of the counter, as the case may be.

Lastly, in order that the multipliers of FIGS. 9 and 11 by an A-C power measuring system, as earlier noted, $E_1$ and $E_2$ would each be selected as one of the two summations $(E + I \cos \theta)$ AND $(E - I \cos \theta)$, where E and I are respectively the values of potential and current in a circuit, and $\cos \theta$ is the power factor. An exemplary circuit useful for providing these input signals to terminals 104 and 106 of FIG. 9, for example, is shown in FIG. 12.

Figure 12:
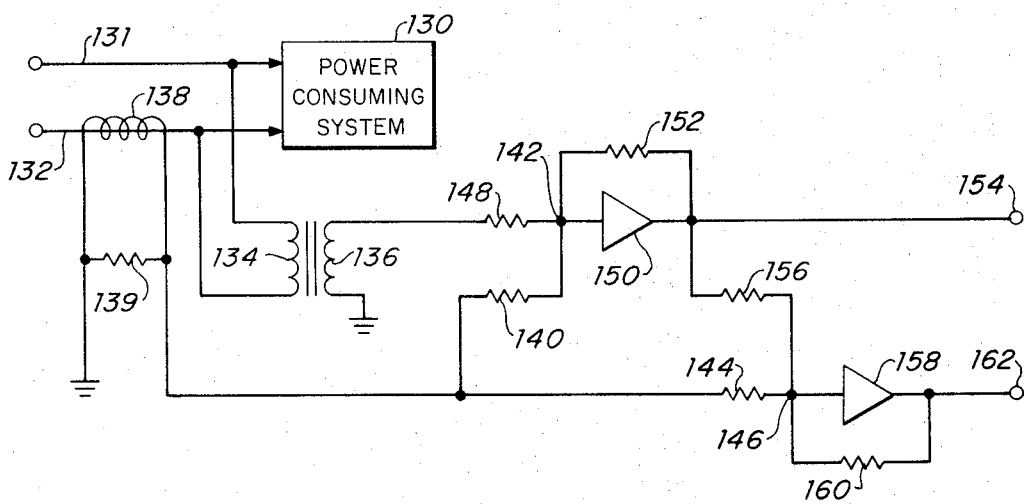
FIG. 12 is a circuit diagram, partly in block form illustrating a device for obtaining sum and difference values for use as input signals to a system such as the multiplier of FIG. 9.

In FIG. 12, there is shown in block form a power-consuming system 130, the A-C power input to which one wishes to measure. The leads 131 and 132, respectively, provide the A-C power to the system. A voltage sensor or primary coil 134 is connected across leads 131 and 132, and inductively coupled to secondary coil 136 to form a transformer. A current sensor or coil 138 is inductively coupled to lead 132. One end of coil 138 is grounded, the other being connected through input resistor 144 to a second summing junction 146. Coil is shunted by resistor 139 to limit voltage. Similarly, one end of coil 136 is grounded, the other being connected through input resistor 148 to junction 142. The latter is connected to the input of very high gain, inverting amplifier 150 which has a feedback resistor 152 connected between output terminal 154 and summing junction 142. Terminal 154, in turn, is connected through another input resistor 156 to summing junction 146. The latter is connected to the input of very high gain inverting amplifier 158 which has a feedback resistor 160 connected between its output terminal 162 and junction 146. The ohmic values of resistors 148, 140, 152, 156, and 160 are all preferably the same, but resistor 144 is one-half the value of resistor 156.

In operating, it will be appreciated that the voltage across coil 136 is proportional to the input voltage E to system 130, and the voltage across coil 138 is proportional to $I \cos \theta$. Inasmuch as amplifier 150, and its feedback and input resistors is simply a summing operational amplifier, the output from the latter, apparent at terminal 154, is proportional to the inverted sum of the inputs or $-(E + I \cos \theta)$. The inputs, however, to amplifier 158, through resistors 156 and 144, are respectively proportional to $-(E + I \cos \theta)$ and $2 I \cos \theta$ because of the 2:1 ratio of values of these resistors. Amplifier 158 and its associated resistors constitute another summer which provides an output proportional to the inverted sum of its inputs of $(E - I \cos\theta)$. Thus, the sum and difference signals are obtained and their polarities can, of course, easily be inverted if desired, although the power inherent in the signals is independent of sign which merely indicates relative phase.

Since certain changes may be made in the above apparatus without departing from the scope of the invention herein involved, it is intended that all matter contained in the above description or shown in the accompanying drawings shall be interpreted in an illustration and not in a limiting sense.

What is claimed is:

1. A quarter-square multiplier for producing the product of a multiplier and a multiplicand, and comprising in combination:

means for producing a first sequence of substantially rectangular waves each of substantially fixed frequency and fixed amplitude and having a pulse width which varies in accordance with the mean squared value of the sum of said multiplier and multiplicand;

means for producing a second sequence of substantially rectangular waves each of substantially fixed frequency and fixed amplitude and having a pulse width which varies in accordance with the mean squared value of the difference between said multiplier and multiplicand; and means for producing a third signal proportional to the difference between the magnitude of the pulse widths of at least one wave of each of said first and second sequences whereby said third signal is proportional to said product.

2. A quarter-square multiplier for producing the product of a multiplier and a multiplicand, and comprising in combination:

means for producing a first signal having a temporal parameter which varies in accordance with the mean squared value of the sum of said multiplier and multiplicand;

means for producing a second signal having a temporal parameter which varies in accordance with the means squared value of the difference between said multiplier and multiplicand; and means for producing a third signal proportional to the difference between the values of the temporal parameters of said first and second signals:

wherein said means for producing said first and second signals each comprises means for producing an iterative signal in which substantially all parameters are fixed except for one temporal parameter, and means for comparing the mean squared value of said iterative signal with the mean squared value of one of said sum of or said difference between said multiplier and multiplicand so as to derive an error signal;

said means for producing said iterative signal being responsive to said error signal so that as the latter tends toward zero the temporal parameter of said iterative signal varies such that the mean squared values of said iterative signal and siad one of said sum of or said difference between said multiplier and multiplicand tend toward a preselected ratio, said temporal parameters of each of said first and second signals being proportional to the temporal parameter of the respective iterative signal.

3. A multiplier as defined in claim 2 wherein said means for producing said iterative signal comprises means for producing a train, at fixed repetition rate of substantially flat-topped waves of substantially fixed equal amplitude, said temporal parameter being the duration of said each wave.

4. A multiplier as defined in claim 2 wherein said means for producing said iterative signal comprises means for producing a train of waves wherein said temporal parameter is the frequency of said train.

5. A multiplier as defined in claim 3 wherein said means for producing a third signal comprises gate means for producing an output signal having a duration established by the coincidence between the duration of corresponding waves of said first and second signals.

6. A multiplier as defined in claim 3 wherein said means for comparing comprises a first terminal at which, respectively, one of said sum or said difference is intended to be applied and a second terminal at which said iterative signal is intended to be applied, means for converting the average power in a signal into an output signal, and means for alternately switching the input of the latter means between said first and second terminals.

7. A multiplier as defined in claim 6 wherein said means for converting comprises a thermocouple with an electrically actuated heater connectable through said switching means to either of said first and second terminals, whereby the output of said thermocouple is said error signal.

8. A multiplier as defined in claim 3 wherein said means for comparing comprises a first terminal at which, respectively, one of said sum or said difference is intended to be applied and a second terminalk at which said iterative signal is intended to be applied, first and second thermocouples each having an electrically actuated heater connected, respectively, to said first and second terminals, and means connecting said thermocouples to provide said error signal as the output thereof.

9. A quarter-square multiplier for producing the product of a multiplier and a multiplicand, and comprising in combination:

means for producing a first signal having a temporal parameter which varies in accordance with the mean squared value of the sum of said multiplier and multiplicand;

means for producing a second signal having a temporal parameter which varies in accordance with the mean squared value of the difference between said multiplier and multiplicand;

means for producing a third signal proportional to the difference between the values of the temporal parameters of said first and second signals whereby said third signal is proportional to said product;

means for generating a fourth signal proportional to the voltage across a power-consuming circuit, second terminal means for generating a fifth signal proportional to the product of the current flowing in said circuit times the power factor relation between said voltage and current, and means for obtaining the sum and differences of said fourth and fifth signals, said sum and differences being said multiplier and multiplicand.

10. A multiplier as defined in claim 9 wherein said means for obtaining said sum and difference comprisies a first summing operational amplifier connected for summing said fourth and fifth signals, and a second operational amplifier having input scaling and being connected for summing the output of said first amplifier with a signal of double the value of one of said fourth or fifth signals.

* * * * *

UNITED STATES PATENT OFFICE
CERTIFICATE OF CORRECTION

Patent No. 3,778,608  Dated December 11, 1973

Inventor(s) Peter L. Richman

It is certified that error appears in the above-identified patent and that said Letters Patent are hereby corrected as shown below:

Claim 8, line 11 "terminalk" should be --terminal--;

Claim 9, lines 34 and 35, "second terminal" should be deleted.

Signed and sealed this 21st day of May 1974.

(SEAL)
Attest:

EDWARD M.FLETCHER,JR.          C. MARSHALL DANN
Attesting Officer              Commissioner of Patents